US008469113B2

(12) United States Patent
Kinsman et al.

(10) Patent No.: US 8,469,113 B2
(45) Date of Patent: Jun. 25, 2013

(54) EARTHWORKING MACHINE

(75) Inventors: Paul Kinsman, Fort Atkinson, WI (US); Mike Jardine, Lake Mills, WI (US); Kurt Kramber, Mukwonago, WI (US); Dick Bedford, Watertown, WI (US)

(73) Assignee: Schiller Ground Care, Inc., Southampton, PA (US)

( * ) Notice: Subject to any disclaimer, the term of this patent is extended or adjusted under 35 U.S.C. 154(b) by 311 days.

(21) Appl. No.: 12/859,899

(22) Filed: Aug. 20, 2010

(65) Prior Publication Data

US 2011/0042112 A1   Feb. 24, 2011

Related U.S. Application Data

(60) Provisional application No. 61/235,547, filed on Aug. 20, 2009.

(51) Int. Cl.
 *A01B 45/04* (2006.01)
(52) U.S. Cl.
 USPC .......................................................... 172/19
(58) Field of Classification Search
 USPC .................. 172/15–21, 41–43; 180/291, 228, 180/19.1, 19.3, 385; 239/149, 722, 600; 296/203, 203.01–209.04; 404/133.1, 133.05, 404/133.2, 118, 114
 See application file for complete search history.

(56) References Cited

U.S. PATENT DOCUMENTS

| | | |
|---|---|---|
| 3,935,904 A | 2/1976 | Beck |
| 3,951,212 A | 4/1976 | Hallman |
| 4,018,287 A | 4/1977 | Brouwer |
| 4,049,060 A | 9/1977 | Hoke |
| 4,109,729 A | 8/1978 | Kaercher, Jr. |
| 4,119,002 A | 10/1978 | Coldiron |
| 4,142,691 A | 3/1979 | Watton |
| 4,188,164 A | 2/1980 | Hansen |
| 4,210,211 A | 7/1980 | Chandler et al. |
| 4,294,316 A | 10/1981 | Hedley et al. |
| 4,310,053 A | 1/1982 | Pearce |
| 4,345,659 A | 8/1982 | Arnold |
| 4,360,980 A | 11/1982 | Jarvis |
| 4,553,606 A | 11/1985 | Arnold |
| 4,577,697 A | 3/1986 | Moak |
| 4,588,034 A | 5/1986 | Leonard et al. |
| 4,616,713 A | 10/1986 | Shattuck |
| 4,621,696 A | 11/1986 | Brouwer |
| 4,632,192 A | 12/1986 | Hooks |
| 4,652,176 A | 3/1987 | Leonard |
| 4,660,650 A | 4/1987 | Moak |
| 4,676,538 A | 6/1987 | Fiedler |
| 4,694,717 A | 9/1987 | Boots |
| 4,871,027 A | 10/1989 | Lindstrom et al. |

(Continued)

*Primary Examiner* — Robert Pezzuto
(74) *Attorney, Agent, or Firm* — Panitch Schwarze Belisario & Nadel LLP

(57) ABSTRACT

An assembly for an earthworking machine includes a head portion, a frame secured to the head portion, a handle assembly, an enclosure which houses at least a portion of a plurality of components for driving the earthworking machine, a first plate secured to a first side of the enclosure and a second plate secured to a second side of the enclosure, and a first set of isolating members. The first and second plates extend from the enclosure along at least a portion of the length of the frame. One of the first set of isolating members is positioned between the frame and the first plate, and another one of the first set of isolating members is positioned between the frame and the second plate.

15 Claims, 12 Drawing Sheets

U.S. PATENT DOCUMENTS

| | | | |
|---|---|---|---|
| 4,934,464 A | 6/1990 | Shields | |
| 4,947,938 A | 8/1990 | Fricke et al. | |
| 4,982,800 A | 1/1991 | Shields | |
| 4,986,026 A | 1/1991 | Decker | |
| 5,009,270 A | 4/1991 | Vangsgard | |
| 5,165,843 A | 11/1992 | Hendriks et al. | |
| 5,170,848 A | 12/1992 | Walton | |
| 5,177,898 A | 1/1993 | Decker | |
| 5,232,055 A | 8/1993 | Van Vuuren | |
| D343,776 S | 2/1994 | Johnson | |
| 5,406,709 A | 4/1995 | Stambaugh et al. | |
| 5,481,827 A | 1/1996 | Decker | |
| 5,609,213 A | 3/1997 | Anderson | |
| 5,690,178 A | 11/1997 | Zehrung, Jr. et al. | |
| 5,743,033 A | 4/1998 | Gegel | |
| 5,775,436 A | 7/1998 | Noyes, II et al. | |
| 5,896,911 A | 4/1999 | Gegel | |
| 5,988,289 A | 11/1999 | Holland et al. | |
| 6,048,282 A | 4/2000 | Prevost et al. | |
| 6,056,064 A | 5/2000 | deVries | |
| 6,135,211 A | 10/2000 | Schroeder | |
| 6,145,224 A | 11/2000 | Stickling | |
| 6,223,830 B1 | 5/2001 | deVries | |
| 6,227,989 B1 | 5/2001 | Reid | |
| 6,273,196 B1 | 8/2001 | Van Vuuren | |
| 6,296,063 B1 | 10/2001 | Tvetene et al. | |
| 6,527,502 B2 | 3/2003 | Leijenaar | |
| 6,604,305 B2 | 8/2003 | Koch | |
| 6,655,466 B2 | 12/2003 | Booker | |
| 6,659,189 B2 | 12/2003 | Woerner et al. | |
| 6,749,365 B2 * | 6/2004 | Sina et al. | 404/133.1 |
| 6,840,333 B2 | 1/2005 | Rieke | |
| 6,962,209 B2 | 11/2005 | Isaman et al. | |
| 7,032,472 B2 | 4/2006 | Mikrut | |
| 7,052,204 B2 * | 5/2006 | Lutz | 404/118 |
| 7,062,350 B2 | 6/2006 | Peterson | |
| 7,165,629 B2 | 1/2007 | Pohlman, Jr. et al. | |
| 7,246,669 B2 | 7/2007 | Cammack | |
| 7,316,286 B2 * | 1/2008 | Hillary | 180/291 |
| 7,389,845 B2 | 6/2008 | Longueville et al. | |
| 7,445,503 B1 | 11/2008 | Zhang et al. | |
| 7,467,514 B2 | 12/2008 | Patel | |
| 2003/0037934 A1 | 2/2003 | Isaman et al. | |
| 2003/0201132 A1 | 10/2003 | Mikrut | |
| 2003/0218361 A1 | 11/2003 | Mikrut | |
| 2004/0256898 A1 | 12/2004 | Longueville et al. | |
| 2005/0189125 A1 | 9/2005 | Matsumoto et al. | |
| 2006/0070747 A1 | 4/2006 | Isaman et al. | |
| 2006/0248885 A1 | 11/2006 | Buckmier et al. | |
| 2008/0313934 A1 | 12/2008 | Smoljo | |

* cited by examiner

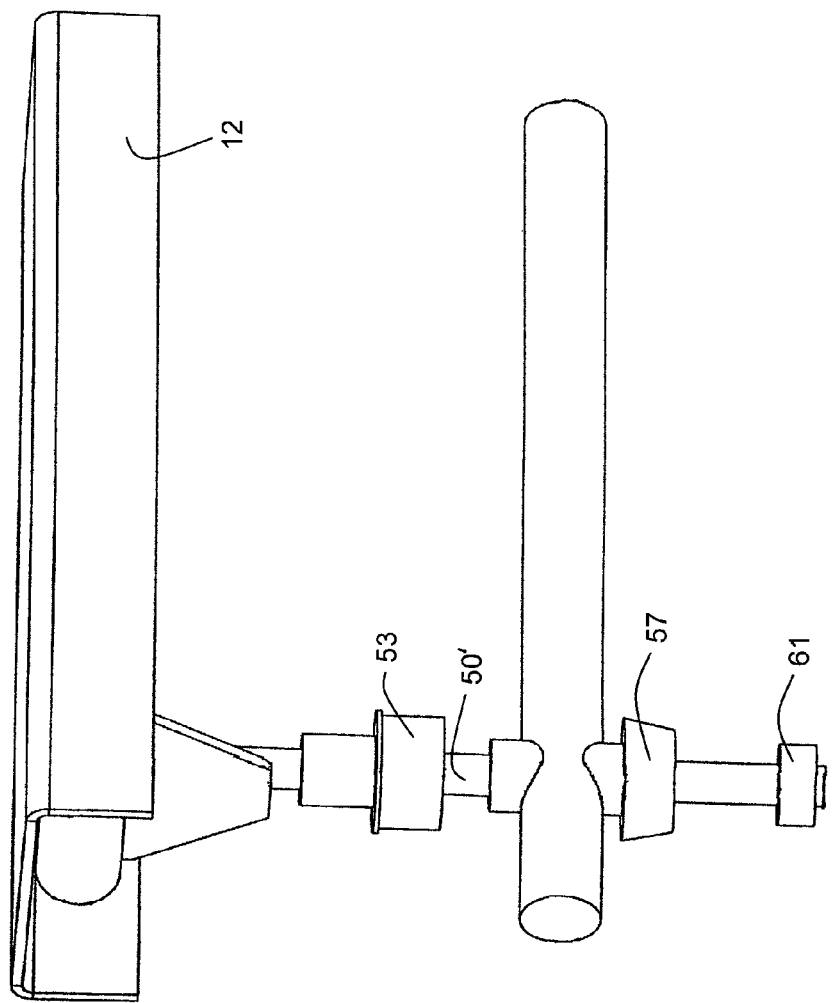

EARTHWORKING MACHINE

CROSS-REFERENCE TO RELATED APPLICATIONS

This application claims the benefit of U.S. Provisional Patent Application No. 61/235,547, filed on Aug. 20, 2009, entitled "Sod Cutter," the entire contents of which are incorporated by reference herein.

BACKGROUND OF THE INVENTION

Sod cutters, a type of earthworking machine, are useful for enhancing the quality of a lawn, but they also aid in reducing labor. Sod cutters are useful for lifting and relocating or repositioning sod, expanding existing flower beds or establishing new ones, or removing sod or grass, for example in areas where shrubs or trees are to be added. Known sod cutters are designed for cutting and removal of strips of soil, grass, sod, etc. and come in a variety of sizes.

Generally, sod cutters are most often used by commercial landscapers, golf courses, and rental houses. There are a wide range of users and usages, ranging from a relatively small project of a home owner to remove a strip or small area of sod or grass to a large project involving the complete removal of an entire lawn. Further, commercial landscapers may often use a sod cutter all day long, on a daily basis. For commercial entities, the sod cutter can be used to cut a strip of new sod, which is to be used as a replacement piece.

Conventional sod cutters comprise a frame, end plates, two axles, four wheels, an engine, a cutting blade and a blade depth control lever, a drive shaft, a power drive system to drive or power the unit forward, and handle bars to be grasped by the user/operator. The power drive system comes in a number of different designs, such as a friction drive, drive shaft, drive chain, belt drives, or may be gear driven. The engine, often manufactured by Honda, Subaru, Briggs, Kohler, Kawasaki or the like, provides power to the cutting blade.

The cutting blade is typically an oscillatory sharp blade that moves in an oscillatory fashion as the sod cutter is driven forward by the user, thereby cutting down to a controlled depth to obtain a strip of grass, sod, etc., which the user may then remove. The blade depth control lever is an adjustable lever which is pivotally mounted on the frame and is engaged with the drive shaft axle, such that the shaft turns and moves as the cutting blade oscillates. The blade assembly can be a single blade or a split blade, wherein two blades move in opposite directions. The oscillatory movement of the blade(s) and the resistance of the material being cut cause vibrations, which are transmitted through the frame and handles to the hands and arms of the user.

As such, conventional sod cutters do not take into account a user's comfort. In particular, the oscillations of the blade(s) cause the entire machine to bounce and vibrate, and the vibrations and motions inevitably reach the user. European health and safety regulations actually impose a limit on the use or operation of a sod cutter, depending on what type of machine is being used. Per the European regulations, once a worker has been subjected to the daily maximum allowable vibration limit, the worker cannot operate the sod cutter or any other equipment.

Using or operating sod cutters beyond the prescribed time limit can cause the user/operator to suffer loss of feeling, numbness and other issues in his/her arms and hands. Some users also suffer tingling of the arms, hands, and body after long exposure from using the machine. Further, long operation of conventional sod cutters can result in overall body soreness and pain.

Further, there are various other controls associated with conventional sod cutters which cause vibrating of the unit. For example, a sod cutter typically includes a cutting device on its sides to cut a square vertical edge in the soil. All of the motion produced by the engine and the mechanical moving components of the sod cutter, such as the oscillating blade(s), gears, belts, etc., result in a rocking and rolling motion of the sod cutter and vibrations which are transmitted through the handle assembly to the user's hands and arms.

Thus, it is desirable to provide a sod cutter having a mechanical shock and vibration isolation system or configuration for operator comfort and safety. In particular, it would be beneficial to provide a sod cutter which isolates the hands and arms of the operator from the vibrations and shock generated by the sod cutter. Such a configuration would be extremely beneficial because an operator would be able to operate, adjust from forward to reverse, perform set and lock functions, and observe results without having to abandon the operating position due to vibrations and shock.

BRIEF SUMMARY OF THE INVENTION

Briefly stated, an embodiment of the present invention is directed to an assembly for an earthworking machine including a head portion, an elongated frame secured to the head portion, a handle assembly configured to be grasped by an operator, an enclosure which houses at least a portion of a plurality of components for driving the earthworking machine, a first plate secured to a first side of the enclosure and a second plate secured to a second side of the enclosure, and a first set of isolating members positioned proximate a base of the frame. The handle assembly is located proximate the head portion and is secured to the head portion. The first and second plates extend from the enclosure along at least a portion of the length of the frame. One of the first set of isolating members is positioned between an exterior surface of the frame and an interior surface of the first plate. Another one of the first set of isolating members is positioned between an exterior surface of the frame and an interior surface of the second plate.

In another embodiment, the present invention is directed to an assembly for an earthworking machine including a head portion, an elongated frame secured to the head portion, a handle assembly configured to be grasped by an operator and which is located proximate the head portion and is secured to the head portion, an enclosure which houses at least a portion of a plurality of components for driving the earthworking machine, a control assembly, and an isolating member secured to the enclosure. The control assembly has a lever, a shaft with first end and a second opposing end, and at least one spring. The first end of the shaft is secured to the head portion. The isolating member has a first end with an aperture formed therein and an opposing second end secured to the enclosure. The second end of the shaft of the control assembly is inserted into and passes through the aperture formed in the isolating member, such that the shaft is movable relative to the isolating member and the control assembly is operatively isolated from the enclosure.

In another embodiment, the present invention is directed to a method of forming an isolation assembly in an earthworking machine including: providing a machine comprising an elongated frame, an enclosure which houses at least a portion of a plurality of components for driving the machine, a first plate secured to a first side of the enclosure and a second plate secured to a second side of the enclosure, the first and second plates extending from the enclosure along at least a portion of the length of the frame; extending a first cylindrical member away from the first plate and toward the frame and extending a second cylindrical member away from the frame and toward the first plate, such that distal ends of the first and second cylindrical members are located in an area between an exterior surface of the frame and an interior surface of the first plate and a gap remains between the distal ends of the first and second cylindrical members; and overmolding an elastomeric material onto a portion of the first and second cylindrical members located in the area between an exterior surface of the frame and an interior surface of the first plate.

BRIEF DESCRIPTION OF THE SEVERAL VIEWS OF THE DRAWINGS

The following detailed description of the preferred embodiment of the present invention will be better understood when read in conjunction with the appended drawings. For the purposes of illustrating the invention, there is shown in the drawings an embodiment which is presently preferred. It is understood, however, that the invention is not limited to the precise arrangements and instrumentalities shown. In the drawings:

FIG. 5A is a greatly enlarged perspective view of a preferred embodiment of the supporting rod assembly of the sod cutter shown in FIG. 1;

DETAILED DESCRIPTION OF THE INVENTION

Figure 1:
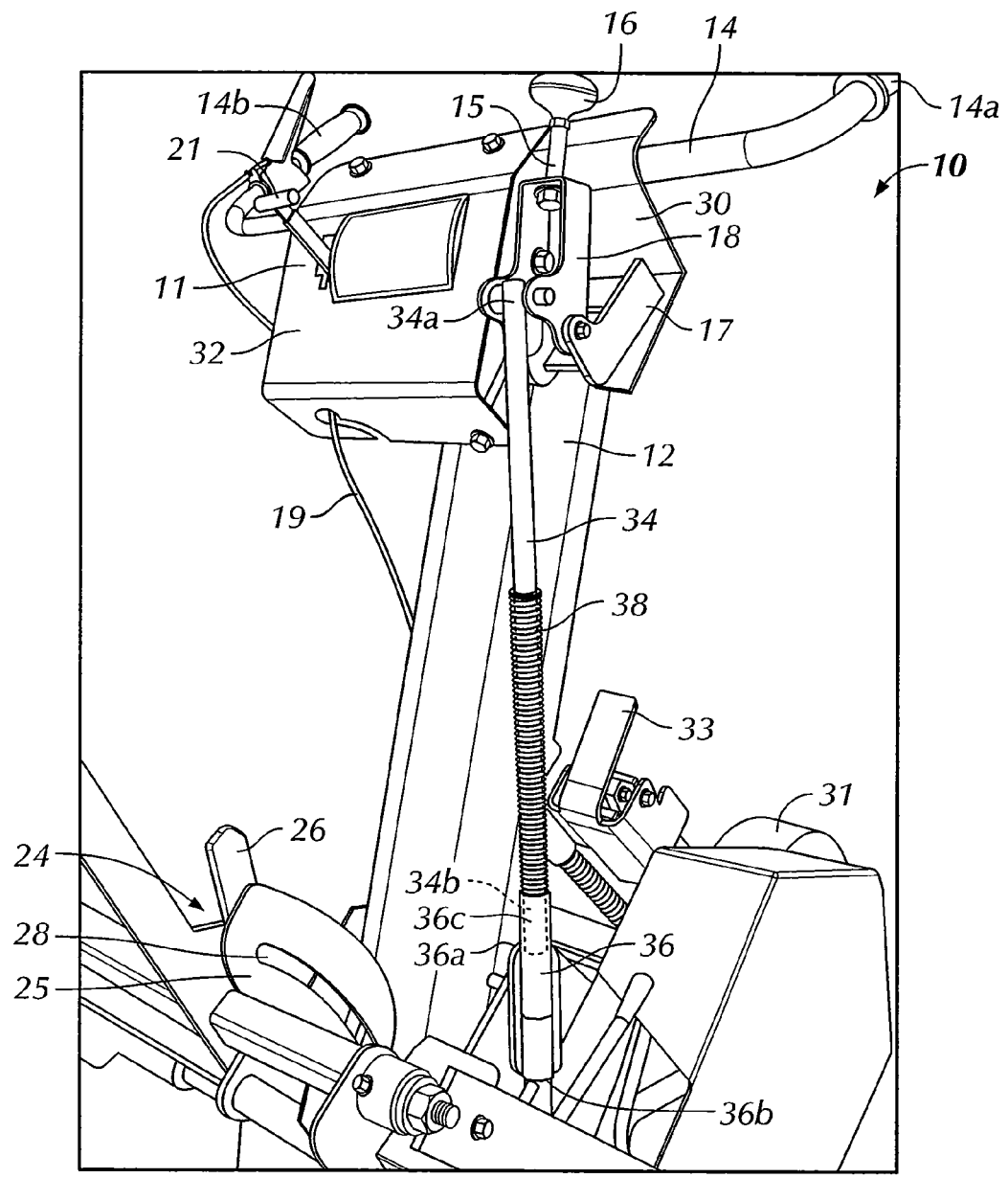
FIG. 1 is a left perspective view of a sod cutter in accordance with a preferred embodiment of the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the sod cutter and designated parts thereof. Unless specifically set forth herein, the terms "a", "an" and "the" are not limited to one element but instead should be read as meaning "at least one". The terminology includes the words noted above, derivatives thereof and words of similar import.

Referring to the drawings in detail, wherein like numerals and characters indicate like elements throughout, there is shown in FIGS. 1-8 a presently preferred embodiment of an earth working machine 10 in accordance with the present invention. With reference initially to FIGS. 1-6, the earthworking machine is a sod cutter 10 which includes a frame 12 and a handle assembly 14.

Figure 2:
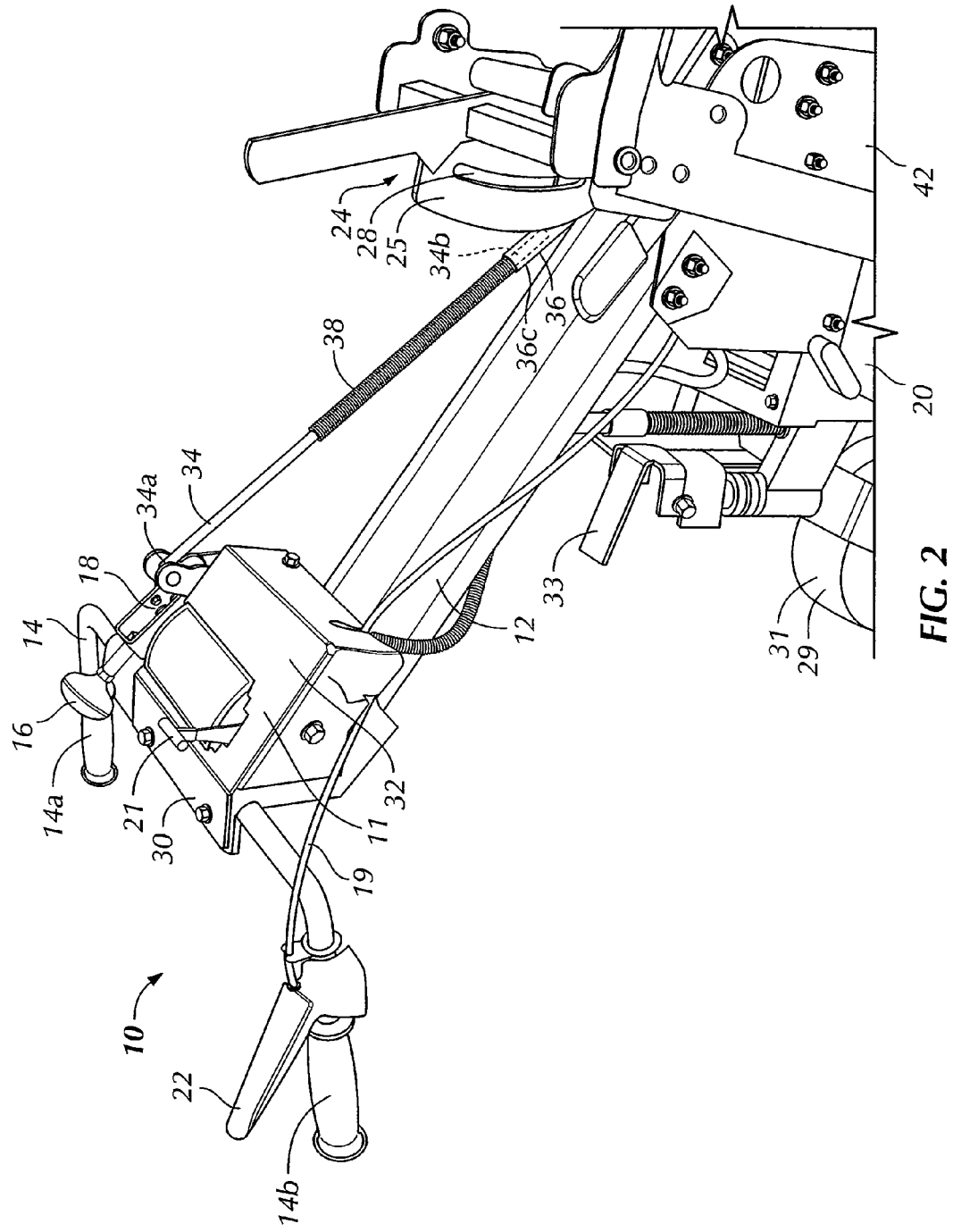
FIG. 2 is a right perspective view of the sod cutter shown in FIG. 1.

With particular reference to FIGS. 1-2, the assembly of the sod cutter 10 comprises a head portion 11, the frame 12, the handle assembly 14, a master clutch control assembly 15 including a master clutch control knob 16 mounted on a bracket 17, a throttle control 18, a shift lever 21, an engine and an engine switch (both not shown), an operator presence control 22, a cutting blade (not shown), and a wheel assembly 29. The sod cutter 10 further comprises a gear casting housing 20 in the form of an enclosure which houses at least a portion of the plurality of components for driving the sod cutter 10, such as the gears, the engine, and the like (see FIG. 2). As shown in FIG. 1, the frame 12 is secured to the head portion 11. Also, the handle assembly 14 is located proximate and secured to the head portion 11. The handle assembly 14 comprises a first handle bar grip 14a and a second handle bar grip 14b which are configured to be grasped by an operator. The operator presence control 22, as shown in FIG. 2, is provided on the second or right handle bar grip 14b and is in the form of a grip or lever that is squeezed to transfer motion to a cable 19. The cable 19 permits the engine to operate in motion. If the operator releases the control 22, the sod cutter 10 stops moving. It will be understood by those skilled in the art that the operator presence control 22 may be positioned in any appropriate location on the sod cutter 10 and may take another form, such as a handle, knob, switch or the like Referring to FIGS. 9A and 9B, the sod cutter 10 further comprises a blade depth control apparatus or assembly 24 including a plate 25, a blade depth control lever 26, a moveable depth stop 27, and a blade depth control locking handle 27a. An elongated slot 28 is cut within or extends through the plate 25 and extends axially from proximate an upper end 25a toward a bottom end 25b of the plate 25. The depth stop 27 is secured to the plate 25 via the elongated slot 28 by a bolt and nut configuration and is movable relative to the plate 25 and slot 28, such that the depth stop 27 may be set at a desired adjusted position along the elongated slot 28. In particular, when the handle 27a is loosened, such as by turning the handle 27a in a first direction (e.g., a counter clockwise direction), the depth stop 27 becomes moveable, so that the operator can move the depth stop 27 to any desired position along the elongated slot 28. When the depth stop 27 is situated at the desired position, the handle 27a should be tightened, for example by turning the handle 27a in a second direction opposite to the first direction (e.g., a clockwise direction), to set and secure the depth stop 27 at the desired position. It will be understood by those skilled in the art that the handle 27a may take any appropriate form, such as knob, lever, grip, or the like.

The position of the depth stop 27 corresponds to the cutting depth or, in other words, the depth to which the cutting blade will cut. More specifically, once the depth stop 27 is secured at the desired position, the operator lowers the blade depth control lever 26 until it contacts the depth stop 27, so that the blade depth control lever 26 is prevented from moving beyond the position of the depth stop 27 (see FIGS. 9A and 9B). This process and configuration establishes the position and depth of the cutting blade. Thus, the blade depth control assembly 24 provides precise setting of the cutting depth and control of the movement of the cutting blade.

Figure 2B:
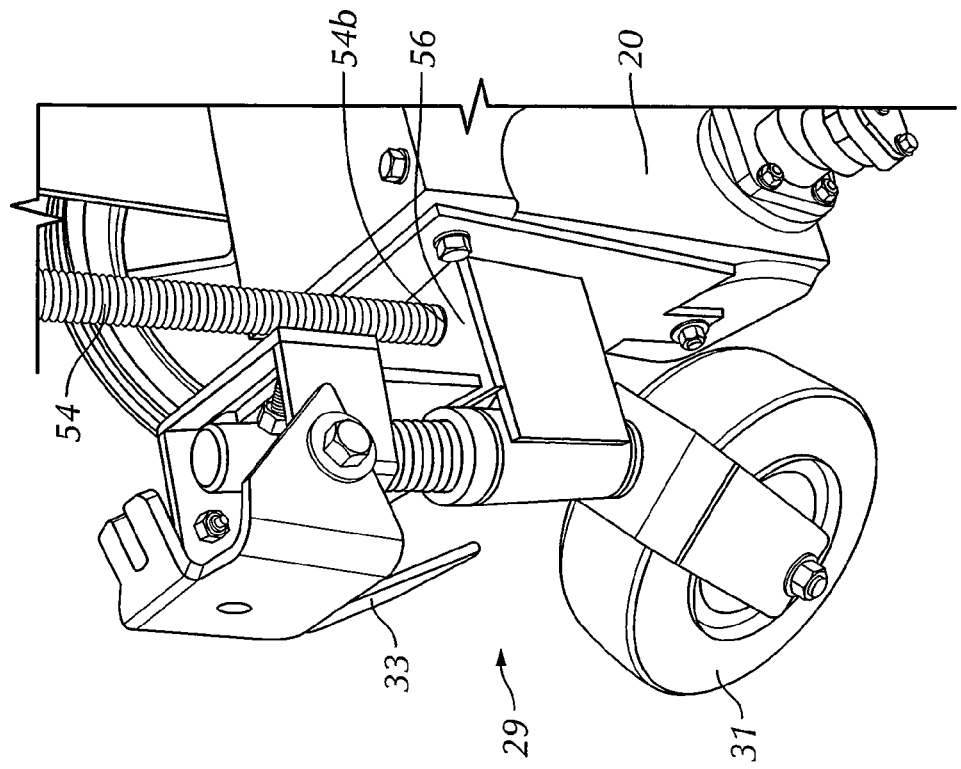
FIG. 2B is left perspective view of the wheel assembly of the sod cutter shown in FIG. 1 with the locking lever in an open position'
Figure 2A:
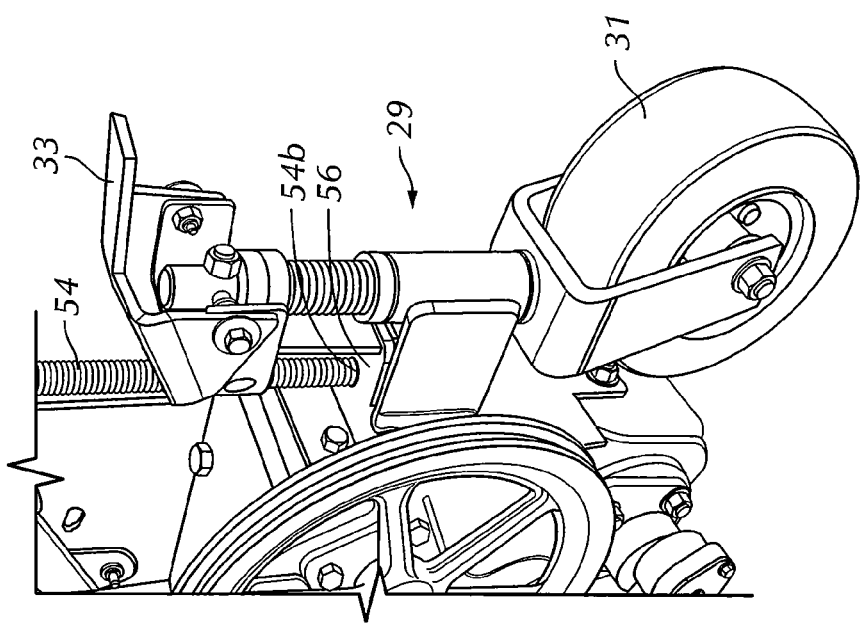
FIG. 2A is a right perspective view of the wheel assembly of the sod cutter shown in FIG. 1 with the locking lever in a closed position.

Referring to FIGS. 2A-2B, the wheel assembly 29 comprises a wheel 31, preferably a pneumatic wheel 31, and a directional locking lever 33. When the locking lever 33 is in a closed or locked position, as shown in FIGS. 2 and 2A, the pneumatic wheel 31 is locked in place and cannot move or turn from side to side. When the locking lever 33 is placed in an open or unlocked position, as shown in FIG. 2B, the pneumatic wheel 31 is capable of freely turning or rotating in any direction. The wheel assembly 29 thus provides for enhanced control of the sod cutter 10 by the operator and enhanced mobility of the sod cutter 10.

Figure 2C:
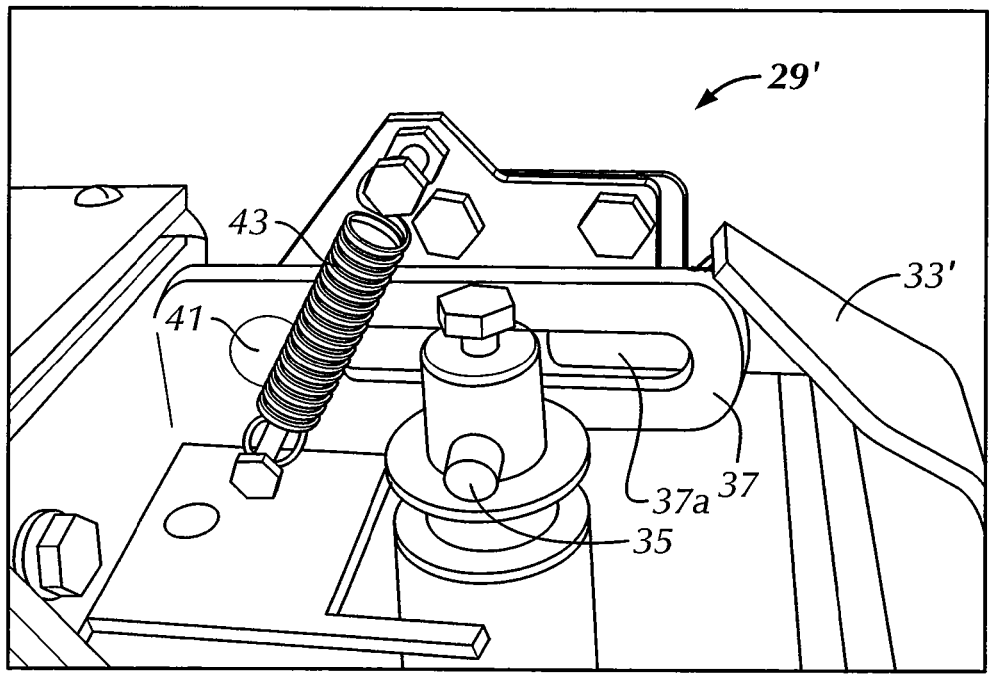
FIG. 2C is a greatly enlarged perspective view of a preferred embodiment of the wheel assembly of the sod cutter shown in FIG. 1 with the locking lever in a closed position.
Figure 2D:
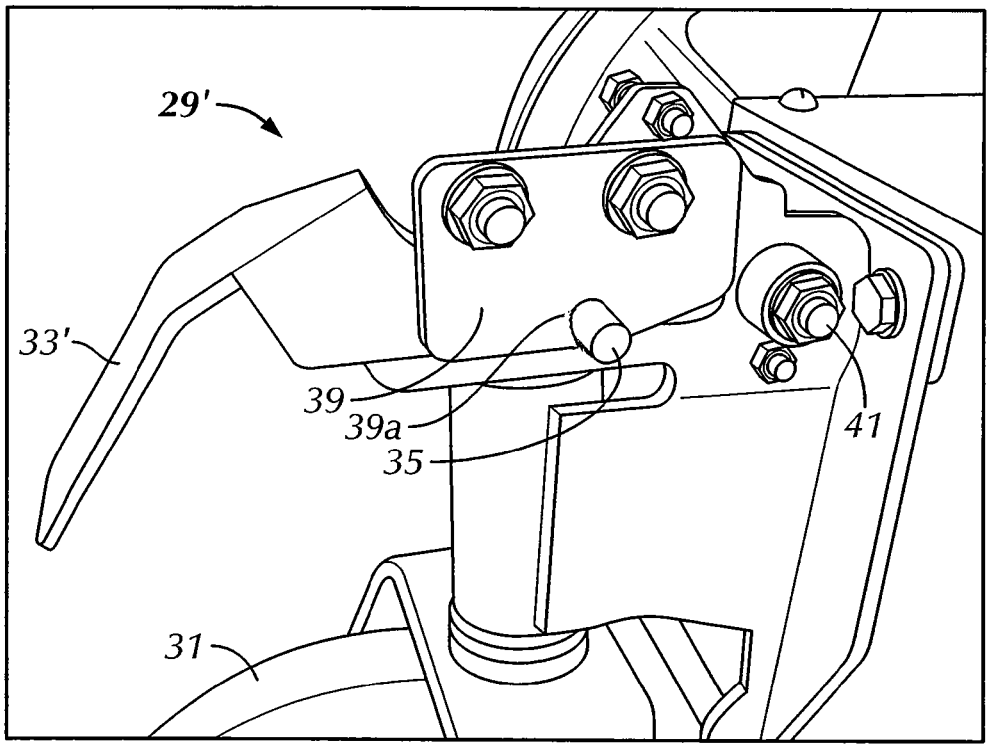
FIG. 2D is a greatly enlarged perspective view of the preferred embodiment of the wheel assembly shown in FIG. 2C.

Referring to FIGS. 2C-2D, there is shown another preferred wheel assembly 29' comprising a directional locking lever 33', a locking rod 35, a spring 43, a first plate 37 and a second plate 39. The first plate 37 includes an elongated slot 37a formed therein. The second plate 39 includes an aperture 39, preferably having a semi-circular shape, formed therein which is configured to receive the locking rod 35. When the locking lever 33' is in a closed or locked position, as shown in FIGS. 2C-2D, the locking rod 35 extends through the slot 37a and the aperture 39a, such that the pneumatic wheel 31 is locked in place and cannot move or turn from side to side. Accordingly, in the closed position, the machine 10 is capable of moving only in a straight orientation. To place the wheel assembly 29' in the open or unlocked position, the locking lever 33' is lifted or moved in an upward direction, such that the assembly 29' pivots in an upward direction about a bolt 41. In the open position, the tension spring 43 holds the locking lever 33' in an extended position, such that movement of the locking rod 35 is not limited by the aperture 39 in the second plate 39 and the pneumatic wheel 31 can freely move or turn from side to side and the machine 10 is capable of moving in various directions.

Figure 3:
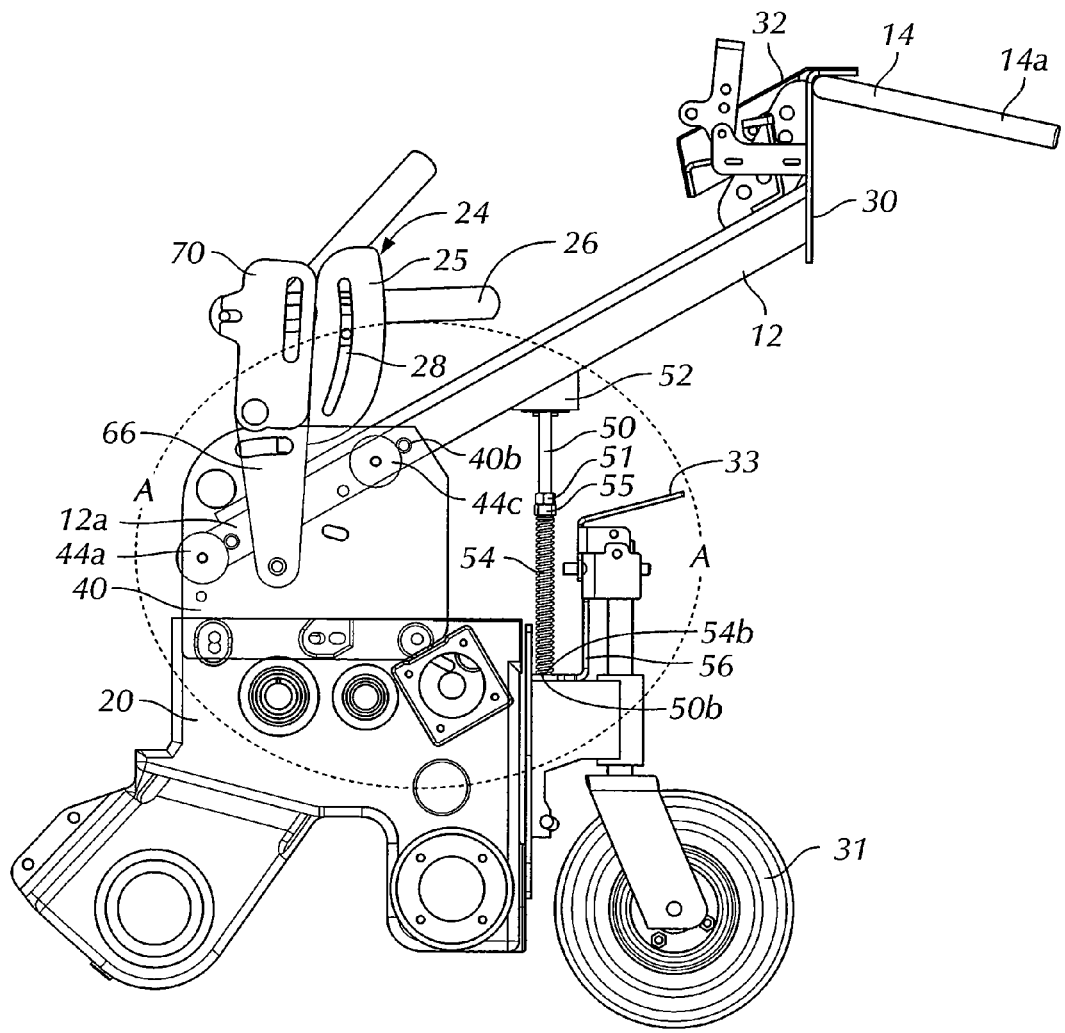
FIG. 3 is a left side elevational view of the sod cutter shown in FIG. 1.

As best illustrated in FIGS. 2 and 3, a cross plate 30 is attached to the frame 12, as well as to the handle assembly 14 and to various controls and levers. Preferably, the cross plate 30 is welded to the frame 12. However, it will be appreciated by those skilled in the art that the cross plate 30 may alternatively be bolted to the frame 12 or may be adjustable in nature. Preferably, the frame 12 is an elongated frame in the form of a U-channel. However, the frame 12 may be in any appropriate form, such as a tube, extrusion, etc. Further, the frame 12 may be made of any appropriate material. For example, the frame 12 may be made of a metal, a plastic, or a combination of materials. Preferably, the frame 12 is a primarily metal frame.

Referring to FIGS. 2-3, the U-channel frame 12 extends obliquely downwardly from the cross plate 30 toward the gear casting housing 20. A control plate 32 is attached to the cross plate 30 and provides support for various lever components of the sod cutter 10, and also covers the levers and various switches so that they are not exposed and cannot be inadvertently actuated by the operator during use. The throttle control 18 is attached to the control plate 32 and controls the speed of the engine.

The master clutch knob 16 and bracket 17 of the master clutch control assembly 15 are attached to the cross plate 30, as best illustrated in FIG. 1. The master clutch control knob 16 engages and disengages with a drive belt (not shown) that drives movement of the sod cutter 10. Referring to FIG. 1, a shaft 34 of the master clutch control assembly 15 is attached and fixed at its first end 34a to the cross plate 30 at the head portion 11 of the sod cutter 10. While the term shaft is used herein to describe this component, it will be understood by those skilled in the art that the shaft 34 may appropriately be described as, for example, a rod, bar, etc. An opposing and distal second end 34b of the shaft 34 moveably engages with a bracket 36 which is secured to a belt drive engaging idler pulley assembly (not shown) which, in turn, is secured to the gear casting housing 20. Specifically, the bracket 36 has a first end 36a, an opposing second end 36b which is secured to a belt drive engaging idler pulley assembly (not shown) which is secured to the gear casting housing 20, and an aperture or opening 36c formed in the first end 36a.

As shown in FIG. 1, the shaft 34 is at least partially surrounded and supported by at least one spring 38, such that the shaft 34 is a spring-loaded component of the sod cutter 10. As such, the distal second end 34b of the spring-loaded shaft 34 is inserted into and is free to move, pass or float up and down through the opening 36c in the bracket 36, such that the shaft 34 is movable relative to the bracket 36. Thus, the vibrations and shock generated from within the gear casting housing 20 are essentially isolated from the master clutch control assembly 15 and cannot travel via the assembly 15 to the control area where the handle assembly 14 is located.

Figure 4:
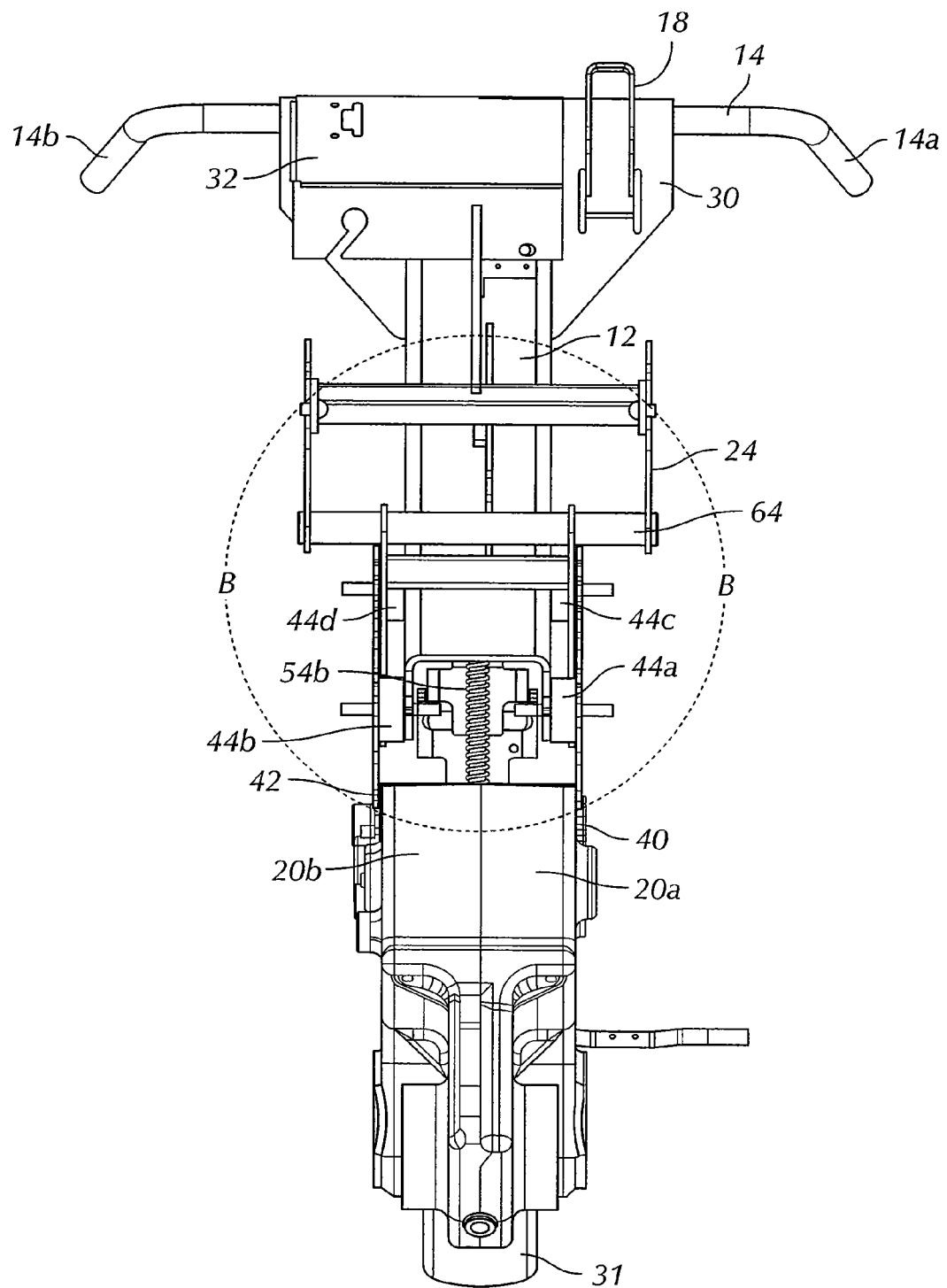
FIG. 4 is a front elevational view of the sod cutter shown in FIG. 1.
Figure 5:
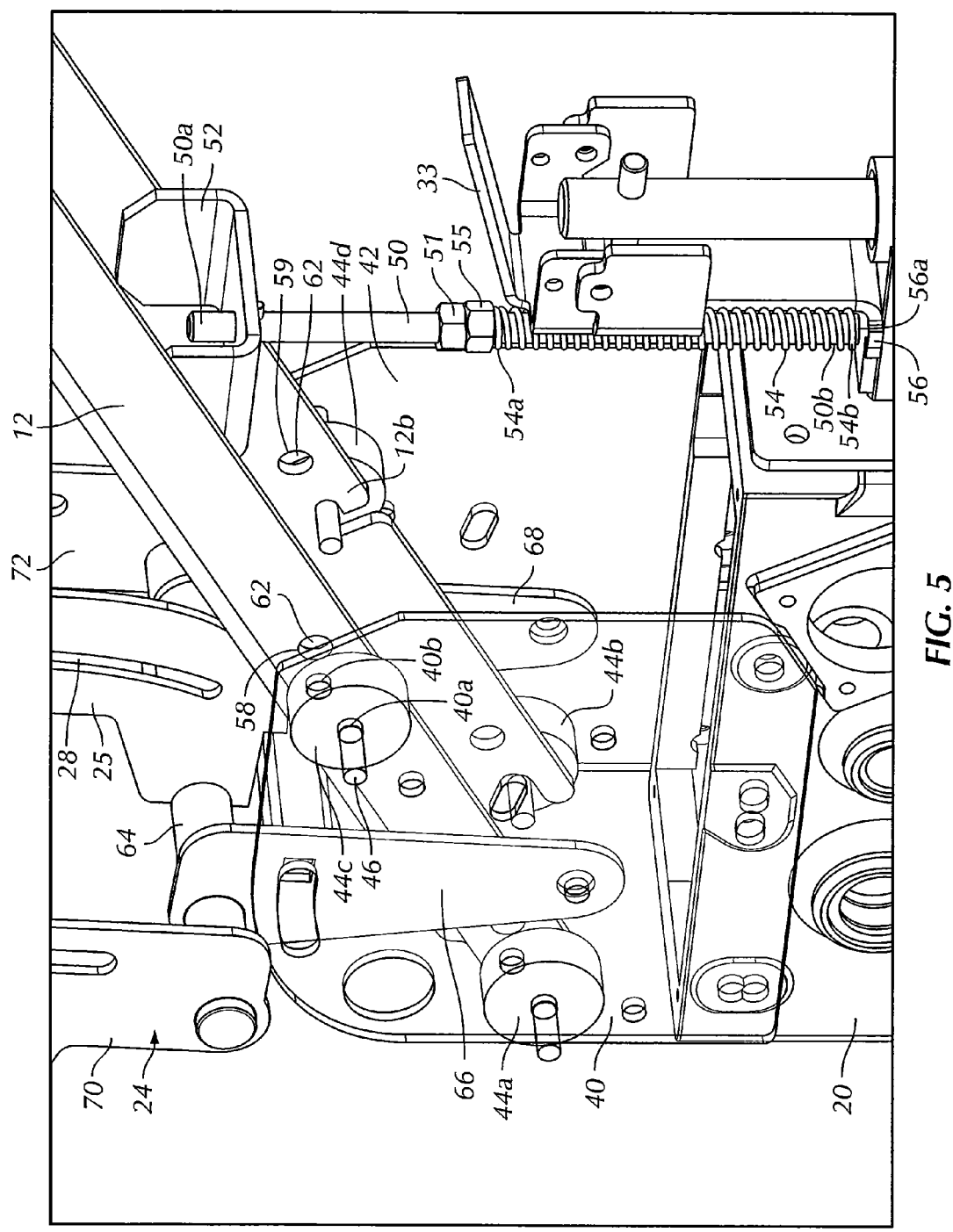
FIG. 5 is a greatly enlarged perspective view of a portion of the sod cutter shown in FIG. 3 taken about area A-A in FIG. 3.

Referring to FIGS. 3-5, the gear casting housing 20 is provided with a first plate 40 and a second plate 42, which correspond to a left side and a right side plate, respectively. However, it will be understood by those skilled in the art that these designations have been assigned for illustrative purposes only and therefore the opposite designations may be used for the plates. The first and second plates 40, 42 are secured, and preferably bolted, to respective first and second sides 20a, 20b of the gear casting housing 20. However, it will be understood by those skilled in the art that the plates 40, 42 may be attached to the gear casting housing 20 by any appropriate alternative means, such as by welding, and that the positions of the first and second plates 40, 42 may be inverted.

Figure 6:
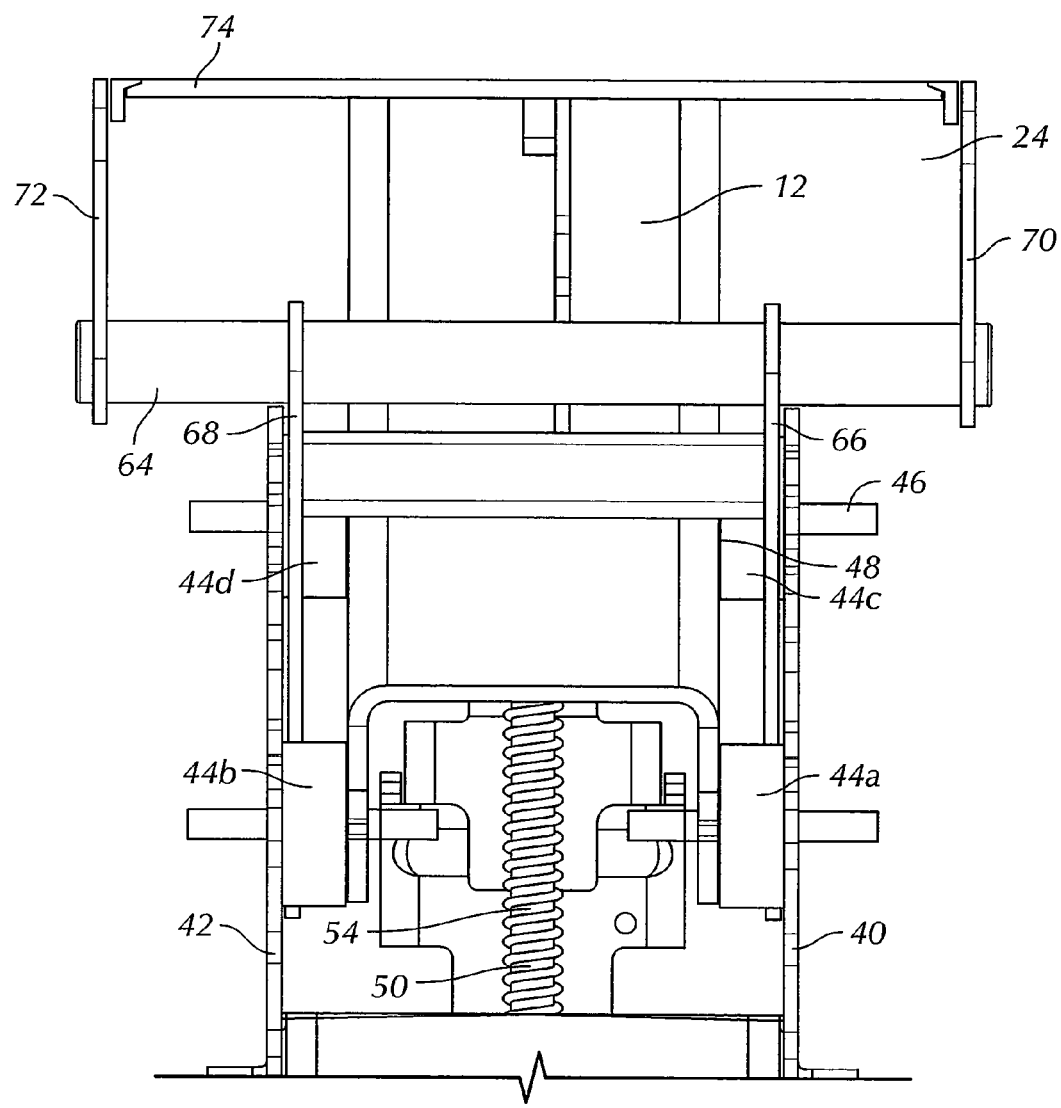
FIG. 6 is a greatly enlarged view a portion of the sod cutter shown in FIG. 4 taken about area B-B in FIG. 4.

Referring to FIGS. 3-5, the first and second plates 40, 42 extend upwardly away from the gear casting housing 20 and along a portion of the length of the U-channel frame 12. More particularly, the first and second plates 40, 42 engage the U-channel 12 via a plurality of isolating or dampening members 44. Preferably, the sod cutter 10 comprises four isolating or dampening members 44a, 44b, 44c, 44d, and particularly a first set of isolating members 44a, 44b and a second set of isolating members 44c, 44d, as best illustrated in FIGS. 4 and 6. The first isolating member 44a and the second isolating member 44b of the first set are provided proximate to a base 12a of the U-channel frame 12. The third isolating member 44c and the fourth isolating member 44d of the second set are provided at positions obliquely upwardly of the first and second isolating members 44a, 44b. Specifically, the first and third isolating members 44a and 44c are spaced apart from each other and are positioned at separate locations between the interior surface of the first plate 40 and the exterior surface of the U-channel frame 12. The second and fourth isolating members 44b and 44d are similarly spaced apart from each other and are positioned at separate locations between the interior surface of the second plate 42 and the exterior surface of the U-channel frame 12. Preferably, as shown in FIGS. 4-6, each of the isolating members 44a, 44b, 44c, 44d has a generally cylindrical shape, but it will be appreciated by those skilled in the art that the isolating members 44 may have any appropriate shape, such as rectangular, spherical, or the like.

The isolating members 44 preferably are formed of an elastomeric material. More preferably, the isolating members 44 are formed of natural rubber with a hardness of 50 to 60 durometer. However, it is also envisioned that the isolating members 44 could be made of any appropriate natural or synthetic material, such as Nitrile rubber, butyl rubber, fluorosilicone rubber, ABS rubber, Latex, an olefinic thermoplastic, urethane, etc. As such, it will be appreciated by those skilled in the art that the isolating members 44 may be formed of a rubber having a hardness of greater or less than 50 to 60 durometer.

Figure 8:
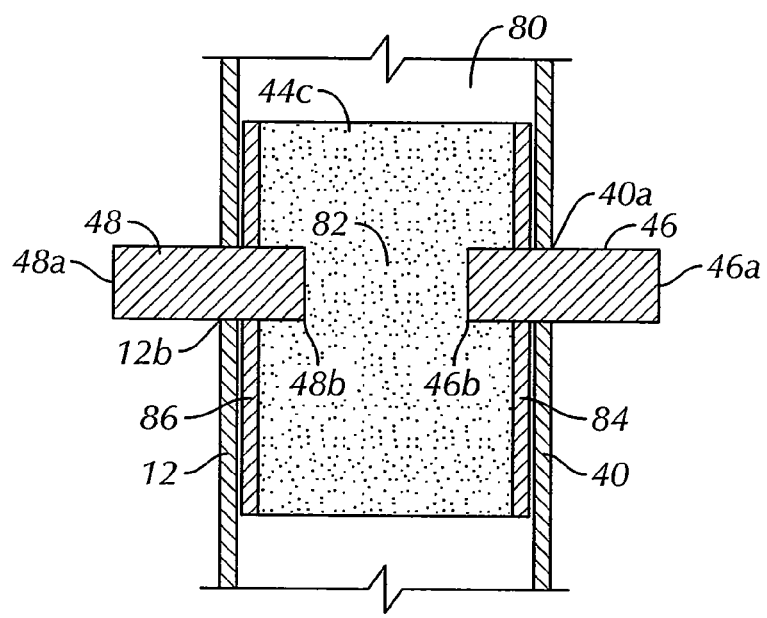
FIG. 8 is a greatly enlarged cross-sectional view of an isolator according to the present invention.

An illustrative description of how each isolating member 44 is formed and positioned is provided with reference to the third isolating member 44c as follows: Referring to FIGS. 5 and 8, a first cylindrical member 46 having a first end 46a and a distal second end 46b extends laterally through a first opening 40a in the first plate 40 and toward the U-channel frame 12, but does not contact the U-channel frame 12. The distal second end 46b of the first cylindrical member 46 is disposed in an area 80 formed between the interior surface of the first plate 40 and the exterior surface of the U-channel frame 12. A second cylindrical member 48 having a first end 48a and a distal second end 48b extends through a first opening 12b in the U-channel frame 12 and toward the first plate 40, but does not contact the first plate 40. The distal second end 48b of the second cylindrical member 48 is disposed in the area 80 between the interior surface of the first plate 40 and the exterior surface of the U-channel frame 12. A gap 82 remains between the first and second cylindrical members 46 and 48 and, more particularly, between the distal second ends 46b, 48b of the first and second cylindrical members 46, 48, respectively, such that the first and second cylindrical members 46 and 48 do not contact each other. Preferably, the positions of the first and second cylindrical members 46 and 48 are at least slightly offset from each other. Preferably, the first and second cylindrical members 46, 48 are first and second bolts 46, 48, though it will be understood by those skilled in the art that the connection means for the plates 40, 42 and U-channel frame 12 may take any appropriate form such as screws, rods, bars, shafts, dowels or the like.

The first and second cylindrical members 46, 48 may be secured in place by any appropriate means, such as a plate, washer, nut, and the like. Preferably, the first cylindrical member 46 is joined to a first securing plate 84 and the second cylindrical member 48 is joined to a second securing plate 86. Preferably, the first cylindrical member 46 and first securing plate 84 and the second cylindrical member 48 and second securing plate 86 are welded together, but the components may be joined by any appropriate means. The third isolating member 44c is formed over at least a portion of the first and second cylindrical members 46 and 48 located in the area 80 between the U-channel frame 12 and the first plate 40 and, more particularly, between the first securing plate 84 and the second securing plate 86. Specifically, the elastomeric material of the third isolating member 44c is overmolded onto at least a part of the inwardly extending portions of the first and second tubular members 46, 48 disposed in the area 80, such that the material of the third isolating member 44c substantially fills the gap 82 between the second ends 46b, 48b of the first and second tubular members 46,48, respectively. Each of the remaining isolating members 44a, 44b, 44d is formed and positioned in the same or substantially the same manner.

Due to the configuration of the engagement between the U-channel frame 12 and the first and second plates 40, 42 of the gear casting housing 20, as well as the elastomeric material of the isolating members 44, the U-channel frame 12 and all of the components attached thereto constitute a floating assembly. The isolating members 44 provide for movement of the U-channel frame 12 relative to the first and second plates 40, 42, such that the U-channel frame 12 is effectively isolated from the moving mechanical and operating components of the sod cutter 10. As such, the isolating members 44 dampen the vibrations generated from within the gear casting housing 20 during operation of the sod cutter 10, and prevent the transfer of energy and the transmission of vibrations and shock from the moving mechanical and operating components of the gear casting housing 20 to the handle assembly 14 in contact with the operator. The third and fourth isolating members 44c and 44d also serve to provide the angle at which the U-channel frame 12 extends obliquely upwardly and the proper height for use of the sod cutter 10.

Referring to FIGS. 3 and 5, in order to support the weight of the U-channel frame 12 and the various components directly or indirectly attached thereto, a supporting rod 50 is preferably attached to the underside of the U-channel frame 12. More particularly, the rod 50 contains a roll pin or through pin which urges or pushes upwardly against a bracket 52 which is attached to the U-channel frame 12. However, it will be understood by those skilled in the art that the rod 50 may urge or push against the U-channel frame 12 by any appropriate means, such as by a bolted bracket, a bolt through the rod 50, or by being directly welded to the U-channel frame 12. As such, a first or top end 50a of the rod 50 extends into or through the U-channel frame 12, or may be fixed to the U-channel frame 12. At a position spaced apart from the bracket 52, the rod 50 is provided with a nut 51 around a portion of its outer circumference and a spring 54 at least partially surrounds and supports the rod 50, such that the rod 50 is a spring-loaded component. A nut or cap 55 is attached to a first or top end 54a of the spring 54, and a second or lower end 54b of the spring 54 is mounted to a bracket 56 which is located proximate and secured to the wheel assembly 29 and the gear casting housing 20 (see FIGS. 2A-2B). The bracket 56 includes an aperture or opening 56a formed therein. The spring 54 is captured or compressed between the nuts 51 and 55 and the bracket 56.

The rod 50 is a floating, spring-loaded rod 50, such that a distal second end 50b of the rod 50 is inserted into and can freely move up and down, or pass, through the opening 56a in the bracket 56. The rod 50 is thus movable relative to the bracket 56, wheel assembly 29 and the gear casting housing 20. The spring-loaded configuration of the rod 50, in particular, provides further vibration dampening and isolation of the U-channel frame 12 from the moving mechanical and operating components of the sod cutter 10. The spring-loaded rod 50 also supports the weight of the U-channel frame 12, the control plate 32, and the handle assembly 14. The additional support of the spring-loaded rod 50 thus bears the weight of the components of the sod cutter 10 together with the isolating members 44, so that the isolating members 44 do not have to bear the weight alone, which could lead the isolating members 44 to sag, elongate, and/or deform, and ultimately fail, thereby allowing vibrations and energy to reach the operator. The nuts 51 and 55 also serve as adjustment mechanisms, so that either more or less spring force may be applied for support or maintenance of the U-channel frame 12, the control plate 32 and the handle assembly 14 in a proper position, such that the isolating members 44 are not caused to sag, elongate, and/or deform when the machine 10 is initially built and subsequently used.

In another preferred embodiment, shown in FIG. 5A, the supporting structure is not spring-loaded. Instead, the includes a supporting rod 50' provided with a first cylindrical stopper 53 and a second cylindrical stopper 57 spaced apart from the first stopper 53. Preferably, the first and second stoppers 53, 57 are welded to the rod 50'. The rod 50' can freely move relative to the U-channel frame and gear casting housing 20, with the first and second stoppers 53, 57 serving as bumpers to limit the movement of the rod 50'. A locking ring 61 is also provide to secure the rod 50' to the machine 10.

Figure 7:
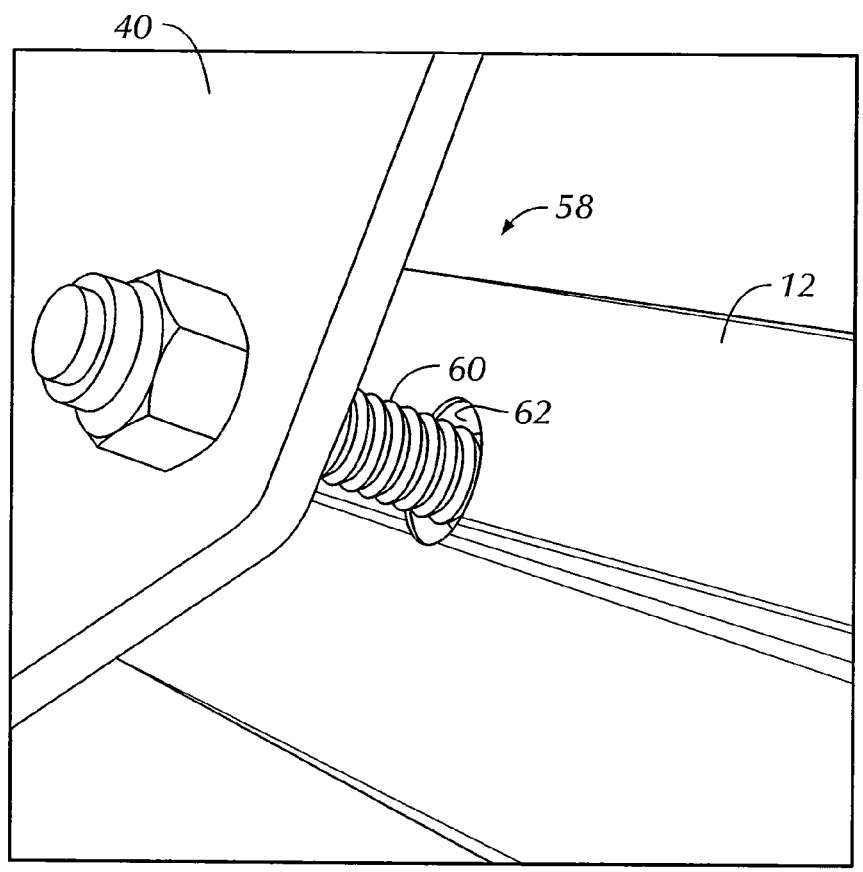
FIG. 7 is a perspective view of a travel stop according to the present invention.

Referring to FIGS. 5 and 7, to control the movement of the U-channel frame 12, a plurality of travel stop assemblies 58 are provided. Preferably, the sod cutter 10 is equipped with a first stop assembly 58 proximate the first plate 40 and a second stop assembly 59 proximate the second plate 42. However, it will be understood by those skilled in the art that the sod cutter 10 may be equipped with more than two stop assemblies. As shown in FIG. 7, each of the first and second stop assemblies 58, 59 comprises a stopper rod in the form of a cylindrical member 60 (not shown in FIG. 5). The cylindrical member 60 of the first stop assembly 58 extends between the first plate 40 and the U-channel frame 12, and the cylindrical member 60 of the second stop assembly 59 extends between the second plate 42 and the U-channel frame 12. Specifically, the cylindrical member 60 of the first stop assembly 58 extends through a second opening 40b in the first plate 40 and engages with a corresponding opening or slot 62 formed in the U-channel frame 12. Similarly, the cylindrical member 60 of the second stop assembly 59 extends through a second opening (not shown) in the second plate 42 and engages with a corresponding opening or slot 62 formed in the U-channel frame 12. Preferably, the cylindrical member 60 of each stop assembly 58, 59 is a bolt, but it will be understood by those skilled in the art that the cylindrical member 60 may be a screw, rod, shaft, bar, dowel or the like. The first and second stop assemblies 58, 59 are generally located obliquely upwardly of the third and fourth isolating members 44c, 44d. Thus, if the operator lifts the sod cutter 10 or applies a downward force or pressure to the handle assembly 14, the length of travel or movement capable by the U-channel frame 12 and, thus, the isolating members 44, relative to the first and second plates 40, 42 is limited. As such, the isolating member 44 will not become deformed during use and the dampening effect of the isolating members 44 will not be affected.

Referring specifically to FIGS. 3-6 and 9A-9B, the blade depth control assembly 24 is also isolated from the handle assembly 14, so that vibrations and motions generated from within the gear casting housing 20 are prevented from traveling toward or being transmitted to the operator. In particular, the blade depth control assembly 24 is not attached to the U-channel frame 12, as in conventional devices, but rather is attached to the first and second plates 40, 42 of the gear casting housing 20.

Figure 9A:
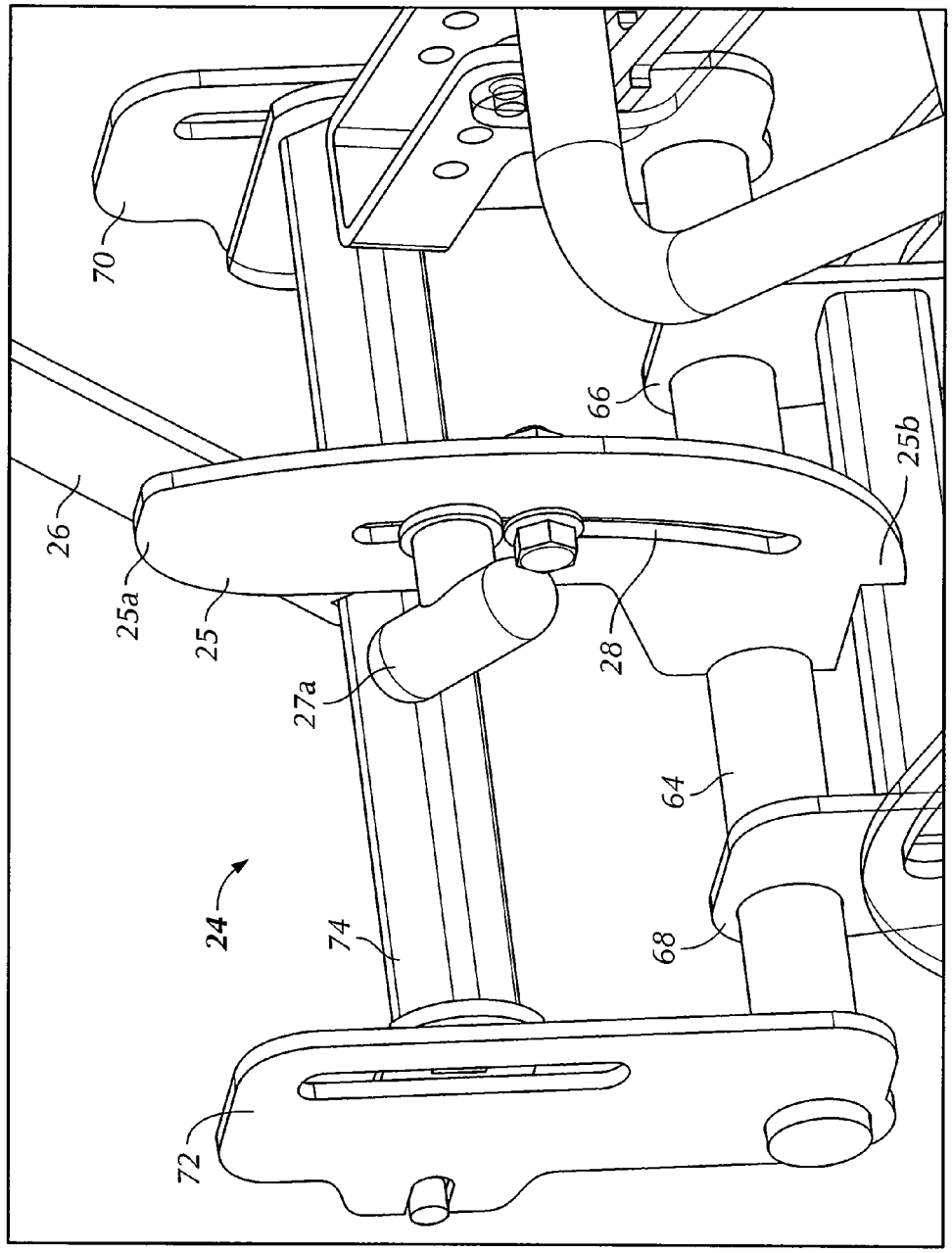
FIG. 9A is a greatly enlarged right side perspective view of a blade depth control assembly according to the present invention.
Figure 9B:
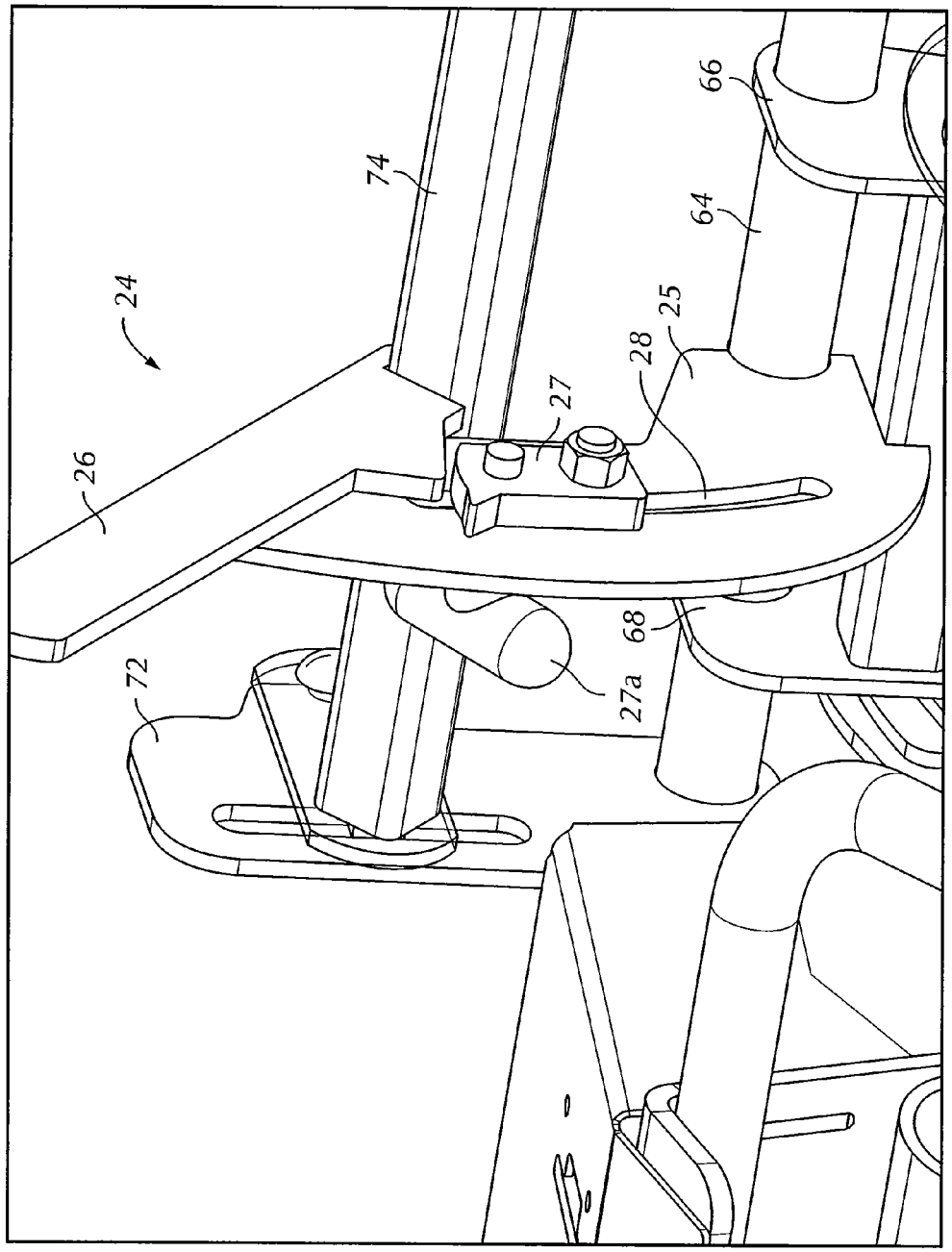
FIG. 9B is a greatly enlarged left side perspective view of the blade depth control assembly according to the present invention.

Referring to FIGS. 9A and 9B, the isolating configuration of the blade depth control assembly 24 is as follows: Proximate the lower end 25b of the plate 25, the plate 25 is attached to a first rod 64 which, in turn, is attached to a plurality of plates. Preferably, the rod 64 is attached to a first plate 66, a second plate 68, a third plate 70 and a fourth plate 72. The first and second plates 66, 68 are attached to the first and second plates 40, 42, respectively, of the gear casting housing 20. The third and fourth plates 70, 72 are located outwardly of the first and second plates 66, 68 and are attached or otherwise fitted to a second rod or tube 74, to which the blade depth control lever 26 is secured. Thus, every component of the blade depth control assembly 24 is isolated from the handle assembly 14. As such, when the blade depth control assembly 24 and the cutting blade are in use to cut pieces of sod or grass, the operator who is holding the handle bar grips 14a and 14b is isolated from the vibrations generated by the moving mechanical components.

Due to the innovative design of the sod cutter 10, the vibrations of all of the moving mechanical and operative components are dampened and the vibrations and energy generated by the mechanical and operative components are isolated from the operator. As such, the operator is not exposed to the harmful vibrations, shock, and bouncing motion of the sod cutter 10 and therefore is capable of using the sod cutter 10 for a relatively longer period of time, from well over one hour to possibly over two hours without detrimental effects. Thus, the sod cutter 10 provides the commercial user the ability to increase productivity.

Additional measures may also be employed or utilized to provide for a dampening and isolation effect of the vibrations. For example, in one embodiment, the blade sprocket shaft (not shown) is made of a lighter weight material, such that there is less moving mass when the oscillatory blade is in motion and, thus, less vibrations are generated. In another embodiment, the pitman arm (not shown), which moves the cutting blade, is altered. Specifically, by reducing the distance that the pitman arm must move, the distance that the cutting blade must move also becomes shortened, thereby reducing the vibrations and dampening the energy which travels up to the operator's hands and arms.

As such, the sod cutter 10 essentially comprises an isolation system for the moving components, an isolation system for the operator's hands and arms, and an isolation system for the handle bar assembly 14 and controls for controlling the sod cutter 10. As such, the sod cutter 10 comprises an inventive isolation and dampening system, in which all or substantially all of the moving mechanical and operating components are isolated from the operator. The invention according to the present invention could also be used in other products in the lawn care industry, as well as in other products containing oscillating blades or devices.

In use, the operator starts the engine by switching the on/off switch to the "on" position, pulling the recoil starter (not shown) and having, if the engine is cold, the choke on. Once the engine has started, the operator takes the choke off, so that the engine runs properly. To move the sod cutter 10 with the cutting blade engaged, the operator places the drive shifter handle (not shown) to the engaged setting, sets the engine speed to slow, and then engages the drive shifter handle. The operator must then depress the operator presence control 22 and engage master clutch control knob 16. At this point, the operator can adjust the throttle 18 to the desired walking speed.

Also, the operator can move the sod cutter 10 without running the engine by putting the drive shifter handle and clutch control knob 16 in the disengaged position. The operator must loosen the blade depth control locking handle 27a, tip the sod cutter 10 forward, lower the blade depth control lever 26 until it hits the depth stop 27, and then tighten the blade depth control locking handle 27a. The operator may then start the engine and engage the appropriate controls to move the sod cutter 10 forward and cause the cutting blade to oscillate. The cutting blade will cut down to the proper depth and the operator can stop the sod cutter 10 to check the depth of cut and thickness of the sod cut at this point. Also, the operator can alter the depth of the cut if needed. At the end of each cut, the operator must lift up on the handle bar grips 14a, 14b to take the cutting blade out of the soil or sod.

The components of the sod cutter 10 are resistant to environmental conditions, such that they will not rust or become contaminated, for example. As such, the sod cutter 10 is exceptionally suited for outdoor applications where extreme temperatures and weather conditions exist, because it is designed for all types of weather conditions.

From this disclosure, one of ordinary skill in the art would recognize that other conventional materials and fabrication techniques could be substituted. Also based on this disclosure, a person of ordinary skill in the art would further recognize that the relative proportions of the components illustrated could be varied without departing from the spirit and scope of the invention.

It will be appreciated by those skilled in the art that changes could be made to the above described preferred embodiment 10 of the sod cutter without departing from the broad inventive concepts thereof. It is understood, therefore, that this invention is not limited to the particular embodiment disclosed, but is intended to cover modifications within the spirit and scope of the present invention as defined by the appended claims.

We claim:

1. An assembly for an earthworking machine comprising:
    a head portion,
    an elongated frame secured to the head portion,
    a handle assembly configured to be grasped by an operator, the handle assembly being located proximate the head portion and being secured to the head portion,
    an enclosure which houses at least a portion of a plurality of components for driving the earthworking machine,
    a first plate secured to a first side of the enclosure and a second plate secured to a second side of the enclosure, the first and second plates extending from the enclosure along at least a portion of the length of the frame,
    a first set of isolating members positioned proximate a base of the frame,
    wherein one of the first set of isolating members is positioned between an exterior surface of the frame and an interior surface of the first plate, and another one of the first set of isolating members is positioned between an exterior surface of the frame and an interior surface of the second plate.

2. The assembly of claim 1, further comprising a second set of isolating members spaced apart from the first set of isolating members, wherein one of the second set of isolating members is positioned between an exterior surface of the frame and an interior surface of the first plate, and another one of the second set of isolating members is positioned between an exterior surface of the frame and an interior surface of the second plate.

3. The assembly of claim 2, wherein the second set of isolating members is positioned obliquely upwardly of the first set of isolating members.

4. The assembly of claim 2, wherein the first set of isolating members has a first isolating member and a second isolating member and the second set of isolating members has a third isolating member and a fourth isolating member.

5. The assembly of claim 1, wherein each of the isolating members has a generally cylindrical shape.

6. The assembly of claim 1, wherein the isolating members are formed of an elastomeric material.

7. The assembly of claim 6, wherein the isolating members are formed of a natural rubber having a hardness of 50 to 60 durometer.

8. The assembly of claim 1, further comprising a wheel assembly, a spring-loaded supporting rod having a first end secured to the frame and a distal second end, and a bracket secured to the wheel assembly and the enclosure and having an aperture formed therein, wherein the second end of the spring-loaded supporting rod is inserted into and passes through the aperture formed in the bracket, such that the spring-loaded supporting rod is movable relative to the bracket, wheel assembly and enclosure and isolates the frame from the enclosure.

9. The assembly of claim 1, further comprising a supporting rod having a first end secured to the frame, a distal second end, a first stopper member and a second stopper member spaced apart from the first stopper member.

10. The assembly of claim 1, further comprising a first travel stop assembly including a stopper rod which extends between the first plate and the frame and a second travel stop assembly including a stopper rod which extends between the second plate and the frame, the stopper rods of the first and second travel stop assemblies limiting movement of the frame relative to the first and second plates.

11. The assembly of claim 1, further comprising a control apparatus configured to control movement of a cutting blade, the control apparatus being operatively isolating from the frame and the handle assembly.

12. An assembly for an earthworking machine comprising:
    a head portion,
    an elongated frame secured to the head portion,
    a handle assembly configured to be grasped by an operator, the handle assembly being located proximate the head portion and being secured to the head portion,
    an enclosure which houses at least a portion of a plurality of components for driving the earthworking machine,
    a control assembly having a lever and a spring-loaded shaft, the spring-loaded shaft having a first end and an opposing second end, the first end of the spring-loaded shaft being secured to the head portion, and
    a bracket secured to the enclosure, the bracket having a first end with an aperture formed therein and an opposing second end secured to the enclosure,
    wherein the second end of the spring-loaded shaft of the control assembly is inserted into and passes through the aperture formed in the bracket, such that the spring-loaded shaft is movable relative to the bracket and the enclosure and isolates the control assembly from the enclosure.

13. A method of forming an isolation assembly in an earthworking machine, the method comprising:
    providing a machine comprising an elongated frame, an enclosure which houses at least a portion of a plurality of components for driving the machine, a first plate secured to a first side of the enclosure and a second plate secured to a second side of the enclosure, the first and second plates extending from the enclosure along at least a portion of the length of the frame;
    extending a first cylindrical member away from the first plate and toward the frame and extending a second cylindrical member away from the frame and toward the first plate, such that distal ends of the first and second cylindrical members are located in an area between an exterior surface of the frame and an interior surface of the first plate and a gap remains between the distal ends of the first and second cylindrical members; and
    overmolding an elastomeric material onto a portion of the first and second cylindrical members located in the area between an exterior surface of the frame and an interior surface of the first plate.

14. The method of claim 12, wherein the first cylindrical member is extended away from the first plate and toward the frame at a position offset from the second cylindrical member.

15. The method of claim 12, further comprising:
    extending a third cylindrical member away from the second plate and toward the frame and extending a fourth cylindrical member away from the frame and toward the second plate, such that distal ends of the third and fourth cylindrical members are located in an area between an exterior surface of the frame and an interior surface of the second plate and a gap remains between the distal ends of the third and fourth cylindrical members; and
overmolding an elastomeric material onto a portion of the third and fourth cylindrical members located in the area between an exterior surface of the frame and an interior surface of the second plate.

* * * * *